(12) United States Patent
Jarzyna et al.

(10) Patent No.: US 8,172,712 B2
(45) Date of Patent: May 8, 2012

(54) COMPACT POWER TRANSFER UNIT FOR TRANSAXLE APPLICATIONS

(75) Inventors: Peter Jarzyna, Oakland Township, MI (US); Donald F. Schmanski, Howell, MI (US); Michael L. Nemeth, Holly, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1017 days.

(21) Appl. No.: 12/109,399

(22) Filed: Apr. 25, 2008

(65) Prior Publication Data

US 2008/0300101 A1 Dec. 4, 2008

Related U.S. Application Data

(60) Provisional application No. 60/940,504, filed on May 29, 2007.

(51) Int. Cl.
F16H 37/08 (2006.01)
(52) U.S. Cl. ........................................ 475/204; 475/206
(58) Field of Classification Search .................. 475/200, 475/204, 206
See application file for complete search history.

(56) References Cited

U.S. PATENT DOCUMENTS

| | | | |
|---|---|---|---|
| 1,462,204 A | 1/1922 | Tobis et al. | |
| 6,905,436 B2 | 6/2005 | Mueller et al. | |
| 7,059,992 B1 | 6/2006 | Bowen | |
| 7,150,694 B2 | 12/2006 | Mizon et al. | |
| 7,189,179 B2 | 3/2007 | Williams et al. | |
| 7,207,409 B2 | 4/2007 | Downs | |
| 7,354,373 B2 * | 4/2008 | Abiru et al. | 475/201 |
| 2007/0084660 A1 | 4/2007 | Downs | |
| 2007/0155571 A1 * | 7/2007 | Nett et al. | 475/200 |

* cited by examiner

*Primary Examiner* — Edwin A Young
(74) *Attorney, Agent, or Firm* — Ralph E. Smith (57) ABSTRACT

The present invention provides a system for providing an improved compact power transfer unit for use in motor vehicles having a front wheel drive transverse based engine and transaxle, and, more particularly, to a power transfer unit for use with a transaxle arrangement capable of providing all-wheel drive or four-wheel drive. The present invention discloses a planetary gear utilizing a fixed ring gear, the planetary gear capable of selectively engaging a low range output from the power transfer unit for propelling the vehicle when driven in off-road conditions requiring higher torque and slower speeds. The vehicle driver can selectively engage a normal, high range where torque flows through the planetary gear directly to the drive shaft with no gear reductions, or the driver may selectively engage the low range where the torque flowing into the planetary gear is redirected and reduced thereby providing higher torque with reduced speed. A neutral range is also selectively engagable by the driver which decouples the planetary gear from the main output shaft whereby no power is transferred to the main drive shaft.

20 Claims, 2 Drawing Sheets

COMPACT POWER TRANSFER UNIT FOR TRANSAXLE APPLICATIONS

CROSS-REFERENCE TO RELATED APPLICATION

This application claims the benefit of the earlier filing date of currently pending Provisional U.S. Patent Application Ser. No. 60/940,504, filed in the United Stated Patent Office on May 29, 2007.

FIELD OF THE INVENTION

The present invention relates generally to an improved compact power transfer unit for use in motor vehicles having a front wheel drive, transverse based engine and transaxle, and, more particularly, to a power transfer unit for use with a transaxle arrangement capable of providing all-wheel drive or four-wheel drive.

BACKGROUND OF THE INVENTION

Currently in the United States a significant portion of new motor vehicles are front-wheel drive based Vehicles. In a front wheel drive vehicle, both the engine and the transmission assembly are typically transversely oriented in the vehicle. A transaxle combines the functionality of the transmission, the differential and the drive axle into one integrated assembly.

Front wheel drive vehicles provide advantages over traditional rear wheel drive vehicles. In smaller front wheel drive vehicles, the engine weight above the front wheels, the drive wheels, provides for increased traction over the relatively lighter rear end of the vehicle. Thus, when a vehicle is driven on slippery surfaces such as a wet roadway or a roadway with a loose surface such as dirt or gravel, the majority of weight is located over the driving (front) wheels. The additional weight of the engine increases the traction between the front wheels and the surface of the road. Increased traction aids the vehicle in turning and reduces the potential for losing traction and skidding or sliding on the road surface. As such, it is advantageous to equip a vehicle with front wheel drive when the overall weight of the vehicle is relatively low.

Recently the automobile industry has experienced a trend in which consumers are purchasing all-wheel drive or four wheel drive vehicles. Consumers have displayed an affinity for larger, heavier, and roomier vehicles that blend the rugged capabilities of a truck with the comfort of a passenger vehicle. These hybrid vehicles have become known as sport utility vehicles or "SUVs." The popularity of SUVs has increased dramatically over the last decade, and the drive systems of these vehicles have become more and more sophisticated. Usually these SUVs are equipped as rear wheel drive vehicles with a selectable four wheel drive mode.

The popularity of four wheel drive SUVs has led the automotive industry to offer conventional automobiles with four wheel drive or all wheel drive options. Thus, smaller vehicles are being produced with four wheel drive modes. The drawback to this is that four wheel drive vehicles typically have lower fuel economy than standard two wheel drive vehicles. With the recent increases in oil prices, fuel economy continues to be a concern for drivers and the need exists for a four wheel drive system that is fuel efficient while still providing the increased traction of four wheel drive.

In addition to consumers becoming increasingly concerned with fuel economy, many consumers are enjoying the extra benefit of being able to drive the vehicle on trails and paths where the extra traction provided by four wheel drive is required to avoid becoming stuck. This activity, commonly known as "off-roading," or "four-wheeling," has gained in popularity. Indeed, many groups now exist solely for the purpose of driving vehicles off-road in groups. In fact, many clubs and organizations now exist that are devoted to driving vehicles off road. Additionally, various racing events now use four wheel drive vehicles in off road races.

As drivers have continued to drive off road and the opportunities for off-road driving have increased, a need has arisen for gearing in vehicles to facilitate off-road driving. Driving a vehicle off a paved road can sometimes involve very slippery or steep conditions. In steep driving conditions, there is a need for the driver to maintain the vehicle at a slow pace. Vehicle speeds normally associated with driving on paved roads typically can be too fast for off-road conditions. While vehicles are equipped with brakes that will slow the vehicle, excessive use of the brakes can overheat the brake pads leading to a decrease of brake efficiency. Thus, gearing inside the transmission is often used to maintain a slower speed when a vehicle is off-road. Typically, an off-road vehicle will have a second set of gears for use off-road. This second set of gears usually has higher torque output and slower speeds than the gears used for normal operation on paved roads. A driver will disengage the normal driving gears and engage the off-road gears (typically called "low-range" gears) once the vehicle leaves the pavement. This second set of gears provides a wider range of torque output and higher traction for a four wheel drive vehicle, thus providing a driver with greater control of power output to the wheels and aiding in operating the vehicle at a slow speed.

As a result of off-road driving, it is entirely possible and, in fact, somewhat likely in certain driving conditions, that a vehicle will encounter a spot where it loses traction and becomes unable to move; it gets stuck. Once a vehicle becomes stuck, various rescue techniques can be used to free the vehicle from the area in which it is stuck. One of the most effective ways to free a stuck vehicle is to tow it with another vehicle. For effective towing, a vehicle should have gears that allow the transmission/transaxle to enter into a neutral range, thus disengaging the drive train from the transaxle and freeing all four wheels to turn independently of the vehicle's engine. Thus, the automobile industry has incorporated neutral ranges into the transmissions and transaxles of four wheel drive and all wheel drive vehicles. The neutral range provides for a simple, effective method to place a vehicle in proper condition to be towed.

The automotive industry has responded to the desire to combine the benefits of four wheel drive, alternative gearing resulting in increased traction, additional torque ranges, and a neutral range, with a fuel efficient engine. Thus, there has been a trend to adapt front-wheel drive schemes and the advantages of front-wheel drive, with the advantages of all-wheel or four-wheel drive applications. A particular challenge has been to also provide additional torque ranges within known front-wheel drive transaxle configurations that can produce torque multiplication and lower vehicle operating speeds. Further, it has been advantageous to provide a neutral range that will allow decoupling of the all-wheel or four-wheel system from the transmission, thus allowing for easy towing.

A variety of power transfer units for front wheel drive vehicles have been described previously and are known in the prior art. None of the power transfer units known in the art, however, are designed to solve the particular problems addressed by the present invention. Therefore, a need still exists for a front wheel drive, transverse based drivetrain with a simple, mechanical clutch and a planetary gear set that allows a greater range of gear ratios including low range, for off road driving, a high range for normal operation of the vehicle, and neutral for use in towing the vehicle.

BRIEF SUMMARY OF THE INVENTION

The present invention provides a novel power transfer unit for a motor vehicle of the type having a front-wheel drive, transverse based engine and transaxle capable of providing on-demand four-wheel or all-wheel drive. The invention includes an input portion that has an input shaft driven by the powertrain and an output portion of a transaxle which includes an output shaft. The invention also includes a planetary gear assembly having a sun gear, a set of planetary gears meshed with the sun gear, and a rotatably supported planetary carrier. The planetary gears are attached to the planetary carrier and meshed with the sun gear and a stationary ring gear. Further, the invention provides that the planetary gear assembly is capable of driving the output shaft with either the sun gear or the planetary carrier. The invention further includes a reduction hub and a range selector having a high range, a low range, and a neutral range. The invention also includes a front axle differential capable of transferring torque to the front axles.

The invention also includes a power transfer unit where the range selector has a first spline set disposed at a predetermined length from the reduction hub. Also, the invention includes provisions such that the first spline set allows torque to flow from the input shaft through the sun gear of the planetary gear set. As the torque flows through the sun gear, it flows directly to the output shaft when the reduction hub is selectively placed in the high range selection.

The invention also includes a power transfer unit wherein the range selector has an additional second spline set disposed to redirect torque from the input shaft and the sun gear. The torque is redirected through the planetary carrier such that the output shaft receives torque from the planetary carrier when the reduction hub is selectively placed in the low range selection.

Further provided by the invention is a power transfer unit that includes a first spline set and a second spline set defining a gap such that when the reduction hub is placed in the neutral range selection, the planetary gear is decoupled from the output shaft. This puts the power transfer unit in a neutral state.

The present invention also includes a power transfer unit that includes a rear differential capable of transferring power to the rear axles. Thus, the present invention provides for a four wheel drive system.

The invention also includes a rear differential that includes a planetary gear capable of providing torque multiplication. This allows the wheels to rotate at a wide variety of speeds without damaging the engine or transaxle.

In addition to the rear axle containing a planetary gear, the present invention also provides for a front axle containing a planetary gear. Like the rear axle, the front axle planetary gear is capable of providing torque multiplication. Thus the vehicle can operate in front wheel drive mode and travel at a wide variety of speeds without damaging the engine.

The present invention also includes a power transfer unit including a control system for selectively controlling the range selector.

The invention may include a control system for selectively controlling the range selector that is a clutch. Alternatively, the control system could be a switch or other mechanism.

The invention further includes a power transfer unit wherein the planetary gear assembly is capable of providing at least two speed ranges outside the output gear range of the transaxle.

The invention contemplates and provides for a power transfer unit wherein the planetary gear set is capable of providing gear reductions from about 2.5:1 to 4.5:1.

The present invention also provides a method for placing a vehicle in proper condition to travel at very low speeds with high torque provided to the wheels. This is known as allowing the vehicle to "crawl." The present invention includes a method for placing a vehicle in proper condition for crawling including engaging a power transfer unit having a front-wheel drive, transverse based engine and transaxle capable of providing on-demand four-wheel or all-wheel drive. Further, the method includes selecting a low range, and engaging a reduction hub, causing the reduction hub to engage a planetary gear assembly. The planetary gear assembly has a sun gear, a set of planetary gears meshed with the sun gear and rotatably supported by a planetary carrier, and planetary gears meshing with the sun gear. The present method further includes causing the planetary gears to mesh with a stationary ring gear, and providing the planetary gear assembly with torque from the transmission or transaxle. Further, the method includes causing the transmission or transaxle to drive an output shaft with the planetary carrier. This causes the output shaft to provide greater torque to the front axles with slower rotation of the axles. This allows the vehicle to crawl.

The present invention also provides a method of crawling including causing the planetary gear assembly to transfer torque to a rear differential capable of transferring power to the rear axles and thereby providing propulsion from the rear wheels.

The invention further provides a method for crawling including utilizing a rear differential which contains a planetary gear to provide torque multiplication.

The present invention furthermore provides a powertrain for a motor vehicle of the type having a front-wheel drive, transverse based engine and transaxle capable of providing on-demand four-wheel or all-wheel drive. The powertrain of the invention includes an internal combustion engine to provide the power in the form of torque. Also included is a transaxle capable of receiving power from the internal combustion engine. Further included in the present invention is a power transfer unit configured to receive power in the form of torque from the transaxle. The power transfer unit of the present invention includes an input portion that is typically an input shaft. The input shaft is driven by the transaxle. Also included in the present invention is an output portion of the power transfer unit including an output shaft and a planetary gear assembly. The planetary gear assembly has a sun gear, and a set of planetary gears meshed with the sun gear and rotatably supported by a planetary carrier. The planetary gears are meshed with the sun gear and a stationary ring gear. The planetary gear assembly is designed to be capable of driving the output shaft with either the sun gear or the planetary carrier. Still further included in the present invention are a reduction hub and a range selector. Also, the present invention includes a front axle differential capable of transferring torque to the front axles.

The present invention includes the powertrain wherein the range selector has a first spline set disposed at a predetermined length from the reduction hub. The first spline set is disposed to allow torque to flow from the input shaft through the sun gear of the planetary gear set. The torque then transfers directly from the sun gear to the output shaft when the reduction hub is selectively placed in the high range selection.

Further included in the present invention is the powertrain wherein the range selector has an additional second spline set. This second spline set is disposed to redirect torque from the input shaft and the sun gear through the planetary carrier. Thus, the planetary carrier transfers the torque to the output shaft. Since the output shaft receives torque from the planetary carrier, the torque is increased and the speed reduced from that entering the sun gear from the input shaft. Thus, torque is increased and speed reduced when the reduction hub is selectively placed in the low range selection.

Still further included in the disclosed powertrain is the power transfer unit having the first spline set and the second spline set define a gap. The gap is such that when the reduction hub is placed in the neutral range selection the planetary gear is decoupled from the output shaft. Thus no torque is transferred through to the differentials and the vehicle is not propelled by the engine.

Further disclosed by the present invention is a powertrain including a rear differential capable of transferring power to the rear axles. The rear differential includes a planetary gear capable of providing torque multiplication. This allows the wheels to rotate at a wide range of speeds without placing strain on the engine.

The present invention also contemplates and includes a powertrain including a front differential containing a planetary gear. The planetary gear included in the front differential is also capable of providing torque multiplication. This allows the front wheels to rotate at a wide range of speeds without placing strain on the engine.

The present invention as described in the following embodiments is an improved power transfer unit of a compact design for a motor vehicle. More specifically, the improved power transfer unit is designed for a vehicle having a front-wheel drive, transverse based engine, and a transaxle that is capable of providing on-demand four-wheel drive or all-wheel drive. More specifically, the power transfer unit includes an input portion powered by the drive train that is operably adapted to indirectly connect to and provide power to an output portion of a transaxle. The power transfer unit also includes a gear multiplication set having multiple speed ranges including at least two speed ranges outside the output gear range of the transaxle. Further, the power transfer unit includes a range selector and a front axle differential. Thus, this power transfer unit configuration as described provides for torque multiplication, low vehicle operating speeds, and a neutral range for decoupling the transaxle from the drive-train in situations where the vehicle will be towed. The power transfer unit additionally includes a mechanical clutch whereby a driver can select low range, high range, or neutral. This selection is achieved by use of a planetary gear set contained in the power transfer unit. The planetary gear set contained in the power transfer unit ideally allows ratios of gear reduction from about 2.5 to 4.5:1. However, the planetary gear set is not limited to a specific range, and other higher or lower gear reductions may also produce satisfactory results.

Through the use of its wide range of gear ratios, the power transfer unit of the present invention provides the ability for a driver to operate a vehicle at extremely slow speeds, or a "crawl." This ability to operate the vehicle at reduced speeds greatly aids in providing greater control of the vehicle as it is operated slowly in rough terrain and can significantly increase the torque to the drive wheels thereby increasing the ability to pull and tow heavy loads. Further, the ability to operate the vehicle at slow speeds and with greater torque provided to the wheels improves the vehicle's ability to climb and descend steep grades with control and without taxing the engine or brakes.

The present invention also provides a power transfer unit that has a selectable low range, high range, and neutral. These selectable gears allow the vehicle to retain normal transmission ratios for normal operation on roads, thus increasing fuel economy, while also providing the ability to select the low-range gearing for off-road driving applications. Further, the ability of the power transfer unit to select a neutral state will allow a driver to place the vehicle in proper condition to allow the vehicle to be pulled or towed without unnecessary transmission wear.

There has thus been outlined, rather broadly, the features of the present invention in order that the following detailed description can be more easily understood, and in order that the present invention's contribution to and expansion of the current art may be better appreciated. There are additional aspects and features of the present invention that will be described and which will form the subject matter of the claims. In this respect, before explaining at least one embodiment of the present invention in detail, it should be understood that the present invention is not limited in its application to the details of construction and arrangements of the components as set forth in the following detailed description and drawings. Rather, the present invention is capable of other embodiments and of being practiced and carried out in various ways. Also, it is to be understood that the phraseology and terminology as employed and used in the following detailed description are used for the purpose of description only and should not be interpreted as limiting in any manner.

As such, those skilled in the art will readily appreciate that the conception upon which this disclosure is based may readily be utilized as the basis for the designing or engineering of other structures, systems, engines, and methods for carrying out the numerous purposes of the present invention. It is important, therefore, that the claims be regarded as including such equivalent constructions insofar as they do not depart from the spirit and scope of the present invention.

Additional aspects and advantages of the present invention will be apparent from the following detailed description of an exemplary embodiment which is illustrated in the accompanying drawings.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides a four wheel or all wheel drive power transfer unit for front wheel drive vehicles equipped with a transverse based engine and transaxle. More specifically, the present invention provides a power transfer unit for use with a transaxle arrangement capable of providing all-wheel drive or four-wheel drive and having the ability to operate at slow speeds and with high torque. Further, the present invention provides a power transfer unit capable of selectively engaging a normal operating gear set for use while driving in normal conditions. Additionally, the present invention provides a power transfer unit capable of selectively engaging a low-range gear set suitable for driving in off-road conditions where it is advantageous to increase torque while decreasing the speed of the vehicle. This torque increase and speed reduction is achieved through the ability to select a range of gear ratios such that the vehicle is operable at "crawl" speeds.

The following detailed description of the preferred embodiment(s) is merely exemplary in nature and is in no way intended to limit the invention, its application, or uses. It can be readily appreciated by those skilled in the art that the following detailed description illustrates and describes only one preferred embodiment of the present invention. As such, the following detailed description should not be considered as limiting in any manner the disclosed invention.

The power transfer unit 10 of the invention is particularly adapted for use in a motor vehicle of the type having a front-wheel drive transverse based engine and transaxle capable of providing on-demand four-wheel or all-wheel drive. Beyond the normal gear range of the transaxle for highway operation and fuel economy, the power transfer unit of the invention creates the ability to (i) operate a vehicle at a "crawl", slowly in rough terrain, (ii) pull heavy loads, (iii) climb and descend steep grades with control and without taxing the engine or brakes, and also (iv) includes a neutral range for decoupling the transaxle from the drive-train to allow the vehicle to be pulled or towed without unnecessary transmission wear.

Figure 1:
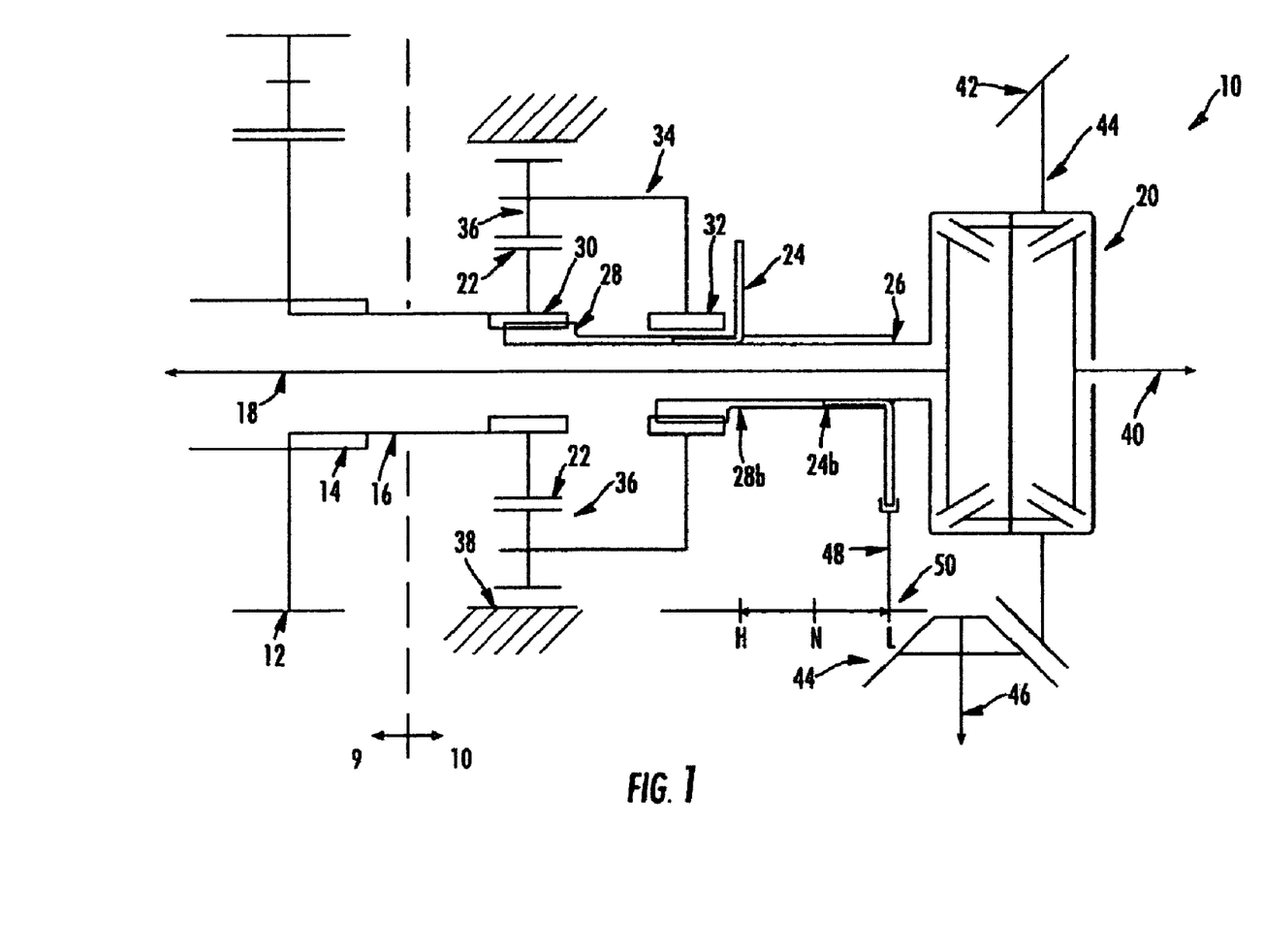
FIG. 1 is a schematic illustration of a power transfer unit according to an exemplary embodiment of the present disclosure.

Referring now to the drawings, FIG. 1 is a schematic illustration of the power transfer unit 10 of the invention which shows power flow from the transmission, or transaxle 9. Transaxle final drive gear and case 12 includes a spline gear 14 that allows input shaft 16 of the power transfer unit 10 to mate with the transaxle final drive gear 12. Power from the engine (not shown) enters the power transfer unit 10 via input shaft 16. Transaxle final drive and gear case 12 according to the invention does not contain a differential axle gear set as would otherwise be typical in this type of application. Instead, the power transfer unit 10 has provisions within its housing for left axle 18 to transfer torque to the left front wheel (not shown). Accordingly, front axle differential assembly 20 according to the present invention resides in the power transfer unit 10.

The power transfer unit 10 has an input shaft 16. The transaxle gear 12 is configured to provide power to the input shaft 16 through splines 14. Input shaft 16 then transmits the power, in the form of torque, into the power transfer unit 10. Input shaft 16 is operatively integrated with planetary sun gear 22. Torque from the input shaft 16 can be directed in one of three ways by means of selectable positions of reduction hub 24. Reduction hub 24 has an inside spline set of a predetermined length that engages a corresponding spline set 26 on the power transfer unit's front axle differential 20. Reduction hub 24 further has shorter length outside splines 28, 28b that are arranged to selectively engage one of two corresponding spline sets 30, 32 located inside the power transfer unit 10.

Still referring to FIG. 1, three possible positions of reduction hub 24 are illustrated and indicated by "H," "N," and "L" on FIG. 1. "H" represents gearing that is used in the normal operation of the vehicle. Such gearing is typical and has gear ratios commonly used in similar power transfer units to propel the vehicle during normal operation. Such gear sets are used when the vehicle is driven under normal operating conditions.

Located in the middle is "N" which illustrates the neutral position for reduction hub 24. Once the reduction hub 24 is selectively engaged in the "N" or neutral position, the power transfer unit 10 is uncoupled from the output shaft 26 and does not transfer power out to the axles. Thus, the vehicle is not propelled. The neutral position is ideal for purposes of towing the vehicle and provides the ability to selectively disengage the power transfer unit 10 from the driving wheels.

To the right of the "N" position is the "L" position. The "L" position illustrates the low-range gearing of the present invention. When the reduction hub 24 is placed in the "L" position, the power transfer unit 10 selectively engages the low-range gearing of the present invention. The low range gearing provides the vehicle with gearing that facilitates the operation of the vehicle in slippery, off-road conditions. The gearing is designed such that it provides high torque to the driving wheels and also allows the vehicle to operate at reduced speeds. Thus, it is clear that reduction hub 24 may selectively engage a high "H," low "L," or neutral "N," position. Specifically, reduction hub 24 selectively engages alternate internal spline sets 30, 32, or no spline sets, depending on what position reduction hub 24 is set to, "H," "N," or "L."

Placed in the "H" position, the left position away from the neutral position indicated by "H," reduction hub 24 forces spline set 28 to engage inner spline set 30 of the input shaft 16. Input shaft 16 transfers power to the sun gear 22 in the planetary gear. In this position, torque is transferred directly from input shaft 16 of the power transfer unit 10 directly to sun gear 22 and then to inner spline set 30. Inner spline set 30 is engaged to the input shaft of the sun gear 22 and power is directed from inner spline set 30 from the rotating sun gear 22, through the reduction hub 24, and ultimately outward to splines on the input to the front differential case 20. In turn, front differential 20 transfers power outwardly to the wheels, thus propelling the vehicle. Thus, selection of the position to the left of neutral for reduction hub 24 results in torque flowing directly through the sun gear 22 in the planetary gear and the normal ranges of gearing being selected. Thus, the vehicle operates at a typical speed and torque range for normal driving conditions.

Alternatively, reduction hub 24 can be selectively placed in the "L" position, the position to the right away from the neutral position. Selecting the position to the right of the neutral position forces outer spline set 28b of reduction hub 24b to engage spline set 32. Spline set 32 in turn engages planetary gear set carrier 34. Thus, selection of the "L" position for reduction hub 24 places the vehicle in the low-range gear ratios. In this selection, torque generated by the engine flows from input shaft 16 to the sun gear 22. However, torque is transferred from sun gear 22 to planetary gears set carrier 34. Inner spline set 32 is integral with planetary gear set carrier 34. Since planetary gear set carrier 34 is affixed to planetary gears 36 which in turn are meshed with sun gear 22, the torque rotating sun gear 22 from the input shaft 16 is transferred to the planetary gears 36. Planetary gears 36 are rotatably engaged to the planetary gear set carrier 34 and are meshed with and orbit inside of the low range ring gear 38. Low range ring gear 38 is fixed to the inside of the power transfer unit's 10 housing such that it is unable to move. Thus, the torque from the orbiting planetary gears 36 transfers to the rotating planetary gear set carrier 34 from sun gear 22. Therefore, planetary gears set carrier 34 rotates and transfers torque through the spline set 32 to reduction hub 24 and then to main shaft 26.

In the "L" selection, the low range option, the gearing of sun gear 22 and planetary gear set carrier 34 is such that power is transferred through the planetary gear, reduction hub 24, and then on to main shaft 26 at a slower speed and higher torque. This is achieved due to the planetary gear speed reduction caused by the power coming from sun gear 22 and transferring to planetary gear set carrier 34. The torque being exerted against the planetary gears 36 by the sun gear 22 and the fixed ring gear 38 transfers from sun gear 22 to planetary gears set carrier 34 through planetary gears 36. The fixed ring gear 38 forces the planetary gears 36 to rotate and thus rotates the planetary gear set carrier 34. Since the planetary gears set carrier 34 is rotating at a rate slower than the sun gear 22, the planetary gears set carrier 34 is rotating at a lower speed than the corresponding sun gear 22. The planetary gears set carrier 34 and the sun gear 22 are contained within the planetary gear within the power transfer unit 10 and are constructed to provide from a range of about 2.5 to about 4.5:1 gear reduction to the vehicle. Thus, the output power to the wheels of the vehicle is increased (by the increased torque) and the movement speed of the rotation of the main shaft 26 is slower.

Forward movement of the vehicle in either of the two, selectable gear sets, "H" or "L" is achieved in the same manner. Specifically, for high range or normal range, reduction hub 24 is selectively engaged to spline set 30 thereby generating torque directly from the sun gear 22 to the main shaft 26. Torque is thus transferred directly from the sun gear 22 to the main shaft 26 without any reduction from the planetary gears set carrier 34. Main shaft 26 in turn transfers the torque to the front axle differential 20. Front axle differential 20 then in turn transfers the torque to the front left axle 18 and front right axle 40. The front left axle 18 and the front right axle 40 in turn transfer the torque to the wheels which propel the vehicle.

Alternatively, forward movement of the vehicle in the low-range gears is selectable by placing the reduction hub 24 in the "L" or low range position as seen in FIG. 1. Reduction hub 24 is selectively placed in the "L" position thus forcing spline set 28 to engage spline set 32. Torque from the input shaft 16 flows into sun gear 22. However, when reduction hub 24 is in the "L" range selection and spline set 32 is engaged, the torque is redirected from sun gear 22 into the planetary gears 36 and thus into planetary gears set carrier 34. Planetary gears set carrier 34 is meshed with planetary gears 36 such that when sun gear 22 rotates planetary gears 36 and forces planetary gears 36 to rotate and orbit around low range ring gear 38, the torque flows from sun gear 22 to the planetary gears set carrier 34. Low range ring gear 38 is fixed to the power transfer unit's 10 housing and unable to rotate. Thus, the rotation of planetary gears 36 and planetary gears set carrier 34 and resultant torque forces the planetary gears set carrier 34 to rotate at a slower rate than sun gear 22, but with increased torque. Thus, when the planetary gears set carrier 34 transfers power to the main shaft 26, the transferred torque is higher but the rotational speed is slower. Main shaft 26 in turn transfers torque to front axle differential 20. The front axle differential 20 then transfers the torque to the left front axle 18 and the right front axle 40. In turn, the left front axle 18 and the right front axle 40 transfer torque to the wheels and the vehicle is propelled. Thus, since the torque from the input shaft 16 flows through the planetary gear switching from output directly from the sun gear 22 to output by the planetary gears set carrier 34, the torque is increased and the speed is decreased.

Figure 2:
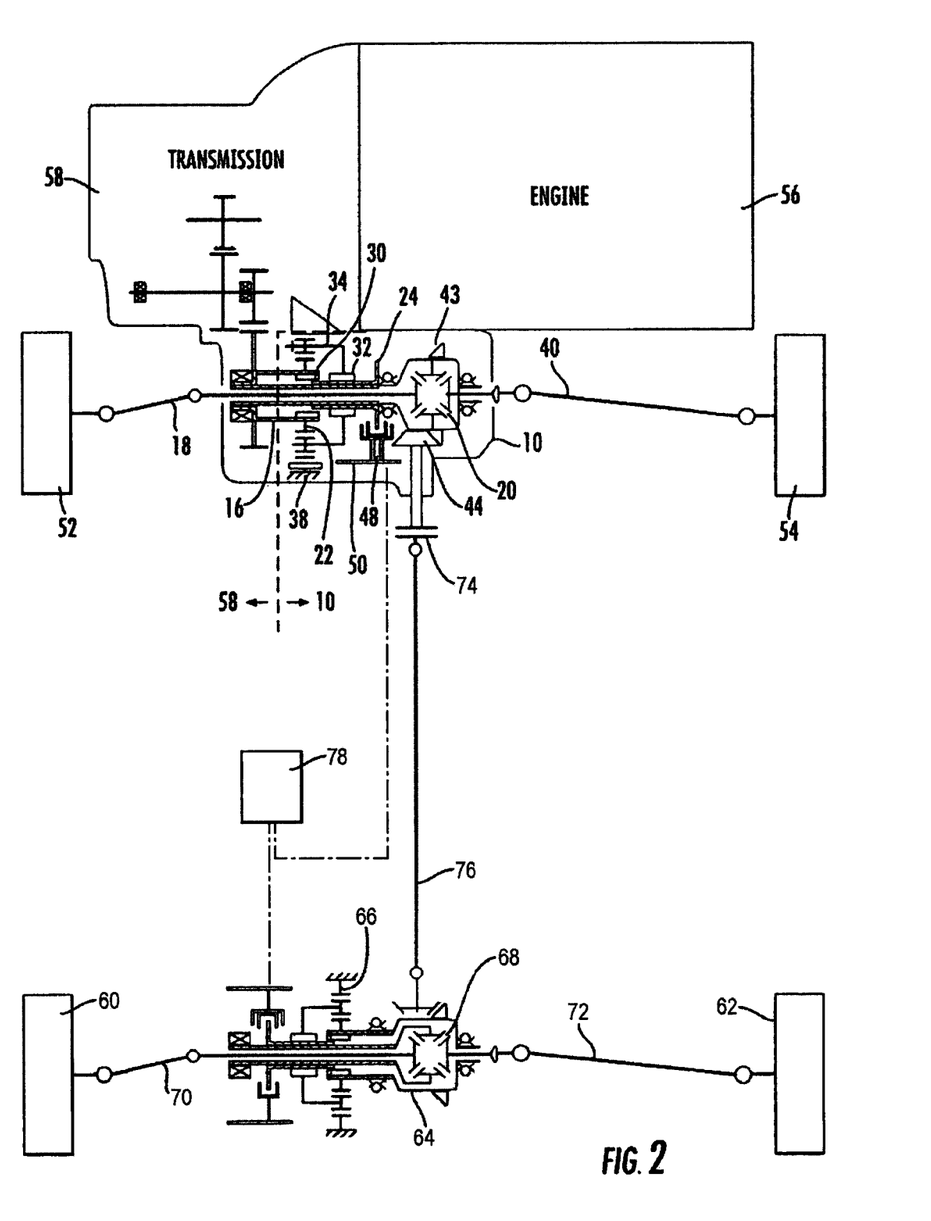
FIG. 2 is a schematic view of the front end of a vehicle illustrating the present invention in relation to the components of the vehicle.

Referring now to FIG. 1 and FIG. 2, front axle differential 20 as illustrated is a bevel-type differential. However, as is easily understood by those skilled in the art, the front axle differential 20 may be of any conventional type in the art such as a planetary differential. Indeed, any type of limited, controlled, or locking differential may be utilized. Torque flows into the front axle differential 20 and is distributed to the two, front axles, left axle 18 and right axle 40. Left axle 18 and right axle 40 in turn transfer torque to the left front wheel 52 and right front wheel 54, respectfully, and the vehicle is propelled.

In addition to the power transfer unit 10 providing power in the form of torque to the front wheels 52, 54, the present invention contemplates the ability for power to be provided to the rear wheels 60,62 in addition to the front wheels 52, 54. This achieves one of the objectives of the present invention; it allows the vehicle to operate in all wheel or four wheel drive. In the described embodiment, main shaft 26 of the power transfer unit 10 provides power in the form of torque to the front axle differential 20. It can readily be appreciated that main shaft 26 may also provide power to a rear axle assembly 64 including a rear drive planetary gear set 66 and a rear differential 68 with which to drive the rear wheels 60,62 through the left and right rear axles 70,72, as seen in FIG. 2. In this embodiment, main shaft 26 provides power to a hypoid ring gear 42. As best seen in FIG. 1, hypoid ring gear 42 is operatively affixed to the front differential gear set outer case 43. Thus, as provided in this embodiment, the hypoid ring gear 42 drives a hypoid pinion gear 44 that sends torque rearward. And, as best seen in FIG. 2, the torque from the hypoid ring gear 42 flows rearward through output shaft 46, through a clutch 74, and on to a propeller shaft 76 and the rear differential 68. Thus, this embodiment provides all wheel or four wheel drive to the vehicle, powering both the front wheels 52,54 and the rear wheels 60,62.

In a preferred embodiment of the present invention, the power transfer unit's 10 output shaft 46 is positioned above the hypoid gear ring 44 and rotated downward about 4 degrees from horizontal. This rotation downward serves to improve the compactness of the overall design and structure of the power transfer unit. Designing and manufacturing the power transfer unit in a compact manner is ideal for packaging while the power transfer unit will take up less of the available space in the engine/transaxle compartment.

In addition to the high range setting and the low range setting for distributing positive torque to the wheels of a vehicle, reduction hub 24 of the present invention is also capable of selectively engaging a third option. A center position is available that places the power transfer unit into a neutral state. The neutral position places the reduction hub 24 and the attached spline set 28 between the input spline set 30, affixed to the sun gear 22, and the spline set 32, affixed to the low range planetary gears set carrier 34. Thus, no power or torque is transferred through the planetary gears to the front differential 20 or the rear differential (not shown). Rather, when selectively engaged in the neutral state, reduction hub 24 does not engage with any splines and thus the planetary gears receive no positive power in the form of torque from the input shaft 16. As such, the power transfer unit 10 of the present invention does not transfer power to the wheels of the vehicle. Consequently, the wheels receive no positive torque and are not rotated as a result of power from the engine. Therefore, the wheels are free to rotate independently of the engine and transmission. When reduction hub 24 is selectively engaged in this neutral state, the neutral state allows the vehicle to be towed and the wheels to rotate without being slowed by the engine. This state is ideal for a vehicle when towed because it reduces wear on the engine transmission and the power transfer unit by disengaging the wheels from the power transfer unit. Thus any wear caused by rotational movement of the gears in the transmission or transaxle is eliminated.

Referring now to FIG. 1 and FIG. 2, reduction hub 24 is controlled by a driver and selectively moved to the "H," "N," or "L" range by means of a shift fork 48. Shift fork 48 is slidably attached to rail 50 such that shift fork 48 can move reduction hub 24 into proper alignment to select the "H" high gear range and input spline set 30. Input spline set 30 engages sun gear 22 and the vehicle operates in the "H" or high gear range. Alternatively, a driver may slide shift fork 48 to the rightmost position thus moving rail 50 into the "L" position thereby selecting and engaging spline set 32. Spline set 32 engages the low range planetary gears set carrier 34 which is rotated by the smaller diameter sun gear 22, thus reducing the speed of rotation and increasing the torque through the planetary gear to the main shaft 26. Still further, a driver may selectively slide shift fork 48 into the center position which moves rail 50 into the "N" position thus selecting the neutral position. While in the neutral position the power transfer unit 10 transmits no torque through the planetary gear and no power is transferred to main shaft 26 and the differentials. As such, the vehicle is not propelled by power from the engine.

Shift fork 48 may be operated by a driver and may be controlled by a cam of various designs used on transfer cases and transmissions. It should be readily appreciated by those skilled in the art that numerous alternative structures would be sufficient for controlling the shift fork 48. The controlling cam or other alternative structure can be moved either manually or electronically, as through use of a control system 78 for selectively controlling the range selector, and it can be controlled selectively by driver input. Such input from the driver may include, for example, a clutch, shift lever, switch, or other similar operative device.

Referring now to FIG. 2, the power flow of the present invention is illustrated. An internal combustion engine 56 generates power. Power is directed through conventional means to a transmission 58. In turn, the transmission 58 provides power in the form of torque to the power transfer unit 10 through the main shaft 16. Main shaft 16 sends torque into the planetary gear, specifically to the sun gear 22. The sun gear 22 provides torque directly to the main shaft 26 through spline 30, when the shift fork 48 is in the high setting, or indirectly through planetary gears set carrier 34 and spline set 32 when the shift fork 48 is in the low range setting. Main shaft 26 then transfers torque to the front differential 20 which transfers the torque to left axle 18 and right axle 40. The axles then transfer the torque on to the wheels 52, 54 of the vehicle thus propelling the vehicle. Power is additionally transferred to the rear differential through a ring gear 43 and a pinion.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A power transfer unit for a motor vehicle of the type having a front-wheel drive, transverse based engine and transaxle capable of providing on-demand four-wheel or all-wheel drive comprising:
    an input portion comprising an input shaft driven by the powertrain;
    an output portion of a transaxle comprising an output shaft;
    a planetary gear assembly having a sun gear, a set of planetary gears meshed with the sun gear and rotatably supported by a planetary carrier, the planetary gears meshed with the sun gear and a stationary ring gear, the planetary gear assembly capable of driving the output shaft with either the sun gear or the planetary carrier;
    a reduction hub;
    a range selector having a high range, a low range, and a neutral range;
    a front axle differential capable of transferring torque to the front axles.

2. The power transfer unit of claim 1, wherein the range selector has a first spline set disposed at a predetermined length from the reduction hub wherein the first spline set is disposed to allow torque to flow from the input shaft through the sun gear of the planetary gear set and then directly to the output shaft when the reduction hub is selectively placed in the high range selection.

3. The power transfer unit of claim 2, wherein the range selector has an additional second spline set disposed to redirect torque from the input shaft and the sun gear through the planetary carrier such that the output shaft receives torque from the planetary carrier when the reduction hub is selectively placed in the low range selection.

4. The power transfer unit of claim 3 wherein the first spline set and the second spline set define a gap such that when the reduction hub is placed in the neutral range selection the planetary gear is decoupled from the output shaft.

5. The power transfer unit of claim 1, further comprising a rear differential capable of transferring power to the rear axles.

6. The power transfer unit of claim 5, wherein the rear differential contains a planetary gear capable of providing torque multiplication.

7. The power transfer unit of claim 1, wherein the front differential contains a planetary gear capable of providing torque multiplication.

8. The power transfer unit of claim 1, further comprising a control system for selectively controlling the range selector.

9. The power transfer unit of claim 8, wherein the control system for selectively controlling the range selector is a clutch.

10. The power transfer unit of claim 1, wherein the planetary gear assembly is capable of providing at least two speed ranges outside the output gear range of the transaxle.

11. The power transfer unit of claim 1, wherein the planetary gear set is capable of providing gear reductions from about 2.5:1 to 4.5:1.

12. A method for placing a vehicle in proper condition for crawling comprising engaging a power transfer unit having a front-wheel drive, transverse based engine and transaxle capable of providing on-demand four-wheel or all-wheel drive;
    selecting a low range and engaging a reduction hub;
    causing the reduction hub to engage a planetary gear assembly having a sun gear, a set of planetary gears meshed with the sun gear and rotatably supported by a planetary carrier, the planetary gears meshing with the sun gear and a stationary ring gear, the planetary gear assembly receiving torque from the transaxle and driving an output shaft with the planetary carrier causing the output shaft to provide greater torque to the front axles with slower rotation of the axles.

13. The method of crawling of claim 12, further comprising causing the planetary gear assembly to transfer torque to a rear differential capable of transferring power to the rear axles.

14. The method of crawling of claim 13 further comprising utilizing the rear differential which contains a planetary gear to provide torque multiplication.

15. A powertrain for a motor vehicle of the type having a front-wheel drive, transverse based engine and transaxle capable of providing on-demand four-wheel or all-wheel drive comprising:

an internal combustion engine;

a transaxle capable of receiving power from the internal combustion engine;

a power transfer unit configured to receive power in the form of torque from the transaxle, the power transfer unit comprising, an input portion comprising an input shaft driven by the transaxle and an output portion of the power transfer unit comprising an output shaft;

a planetary gear assembly having a sun gear, a set of planetary gears meshed with the sun gear and rotatably supported by a planetary carrier, the planetary gears meshed with the sun gear and a stationary ring gear, the planetary gear assembly capable of driving the output shaft with either the sun gear or the planetary carrier;

a reduction hub;

a range selector;

a front axle differential capable of transferring torque to the front axles.

16. The powertrain of claim 15, wherein the range selector has a first spline set disposed at a predetermined length from the reduction hub wherein the first spline set is disposed to allow torque to flow from the input shaft through the sun gear of the planetary gear set and then directly to the output shaft when the reduction hub is selectively placed in a high range selection.

17. The powertrain of claim 16, wherein the range selector has an additional second spline set disposed to redirect torque from the input shaft and the sun gear through the planetary carrier such that the output shaft receives torque from the planetary carrier when the reduction hub is selectively placed in the low range selection.

18. The powertrain of claim 17, wherein the first spline set and the second spline set define a gap such that when the reduction hub is placed in a neutral range selection the planetary gear assembly is decoupled from the output shaft.

19. The powertrain of claim 15, further comprising a rear differential capable of transferring power to the rear axles wherein the rear differential contains a planetary gear capable of providing torque multiplication.

20. The powertrain of claim 15, further comprising a front differential containing a planetary gear capable of providing torque multiplication.

* * * * *

UNITED STATES PATENT AND TRADEMARK OFFICE
Certificate

Patent No. 8,172,712 B2                                         Patented: May 8, 2012

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Peter Jarzyna, Oakland Township, MI (US); Donald F. Schmanski, Howell, MI (US); Michael L. Nemeth, Holly, MI (US); and Joseph Kubina, Oxford, MI (US).

Signed and Sealed this Twenty-seventh Day of May 2014.

STEFANOS KARMIS
*Supervisory Patent Examiner*
Art Unit 3653
Technology Center 3600